United States Patent [19]

Deary

[11] Patent Number: 5,443,114
[45] Date of Patent: Aug. 22, 1995

[54] EVAPORATOR DISCHARGE COOLED TRANSMISSION OIL PAN

[76] Inventor: Reynaldo M. Deary, 1224 Turtle Creek Dr., Brownsville, Tex. 78520

[21] Appl. No.: 338,120

[22] Filed: Nov. 9, 1994

[51] Int. Cl.⁶ .................................................. F25D 21/14
[52] U.S. Cl. ................................. 165/41; 165/47; 165/916; 62/279; 62/291; 62/285; 62/316; 74/606 A
[58] Field of Search ................. 62/285, 286, 289, 291, 62/279, 316; 60/912; 165/47, 41, 916; 74/606 A

[56] References Cited

U.S. PATENT DOCUMENTS

| | | | |
|---|---|---|---|
| 998,876 | 7/1911 | Daimler | 60/912 |
| 2,776,547 | 1/1957 | King et al. | 62/279 |
| 2,796,239 | 6/1957 | Holmes et al. | 60/912 |
| 2,820,351 | 1/1958 | Dolza et al. | 62/279 |
| 2,932,177 | 4/1960 | Brennan | 62/279 |
| 3,070,975 | 1/1963 | Cornelius | |
| 3,209,551 | 10/1965 | Jentet | |
| 3,299,738 | 1/1967 | Sand | |
| 3,306,067 | 2/1967 | Anglin | 62/279 |
| 3,406,591 | 10/1968 | Homiller | |
| 3,812,687 | 5/1974 | Stolz | 62/291 |
| 3,882,692 | 5/1975 | Watanabe et al. | 62/291 |
| 4,494,384 | 1/1985 | Lott | 62/279 |
| 5,193,415 | 3/1993 | Massel | |

FOREIGN PATENT DOCUMENTS

| | | | |
|---|---|---|---|
| 55-115656 | 9/1980 | Japan | |
| 0586013 | 12/1977 | U.S.S.R. | 62/285 |

*Primary Examiner*—John K. Ford
*Attorney, Agent, or Firm*—Richard C. Litman

[57] ABSTRACT

An apparatus for cooling an engine or component in a vehicle which employs an air conditioning unit such that the condensate which naturally forms on the evaporator during air conditioner unit operation is collected and directed to the transmission pan to enhance cooling.

6 Claims, 1 Drawing Sheet

EVAPORATOR DISCHARGE COOLED TRANSMISSION OIL PAN

BACKGROUND OF THE INVENTION

1. Field of the Invention

This invention relates to refrigeration or cooling, specifically of engine components.

2. Description of the Prior Art

During normal operation of an engine, the impelling forces and interaction of the parts generate heat. Although hotter engines theoretically tend to be more efficient, real world materials delineate thermal boundaries which are crossed at great consequence to the operator. As an engine is operated at higher temperatures, engine lubricant thins which accelerates wear and heat build-up. At extreme temperatures, the engine parts may even melt and fuse together.

To avoid wear and melt-down, engine systems are designed with cooling systems. Air cooling systems employ ambient air convection to drive off engine heat. Wetter cooled systems involve circulating water through the engine and a heat exchanging radiator with a pump. The present invention urges the condensate which naturally forms on an air conditioning unit's evaporator to associate with and cool hot engine parts.

U.S. Pat. No. 3,070,975 issued Jan. 1, 1963 to W. C. Cornelius describes an engine cooling system which involves associating the return refrigerant coil of a vehicle's air conditioning system with the coolant return to the radiator. This system fails to take advantage of the condensate which naturally forms on an air conditioning unit's evaporator.

U.S. Pat. No. 3,209,551 issued Oct. 5, 1965 to M. L. Jentet describes a vehicle air conditioning system where the refrigerant returning to the condenser is associated with "components dispersing heat" in an engine. This system also fails to take advantage of the condensate which naturally forms on an air conditioning unit's evaporator.

U.S. Pat. No. 3,229,738 issued Jan. 24, 1967 to D. R. Sand describes a transmission oil pan cooling system much like the common radiator system associate with water cooled vehicle engines. This system suffers the same disability as the above inventions.

U.S. Pat. No. 3,406,591 issued Oct. 22, 1968 to I. H. Homiller describes a transmission housing coolant system where ambient air is forced through the transmission housing. Again this system fails to use the evaporator condensate.

None of the above inventions and patents, taken either singly or in combination, is seen to describe the instant invention as claimed.

SUMMARY OF THE INVENTION

An object of the invention is to cool an engine transmission oil pan or other engine component with the condensate which naturally forms and drips off of an air conditioning unit's evaporator.

Another object of the invention is to promote higher engine efficiency by facilitating subsystem cooperation.

A further object of the invention is to provide improved elements and their arrangement in an apparatus for the purposes described which are inexpensive, dependable and effective.

These and other objects of the present invention will become readily apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
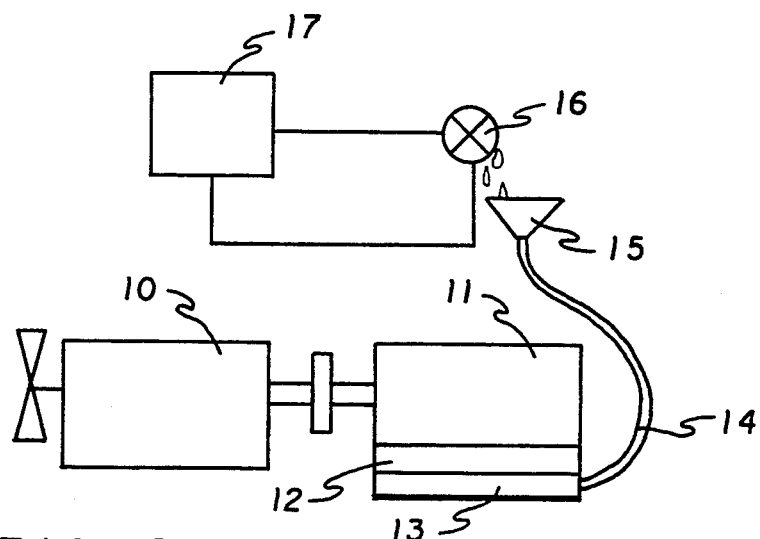
FIG. 1 is a diagrammatic view of an embodiment of the invention showing an engine, transmission, transmission oil pan and air conditioning unit in which the condensate which naturally forms on the evaporator of the vehicle's air conditioning system is collected in a condensate collector funnel and directed to a foam condensate distributor located in front of and under the transmission oil pan to assist in cooling it.
Figure 2:
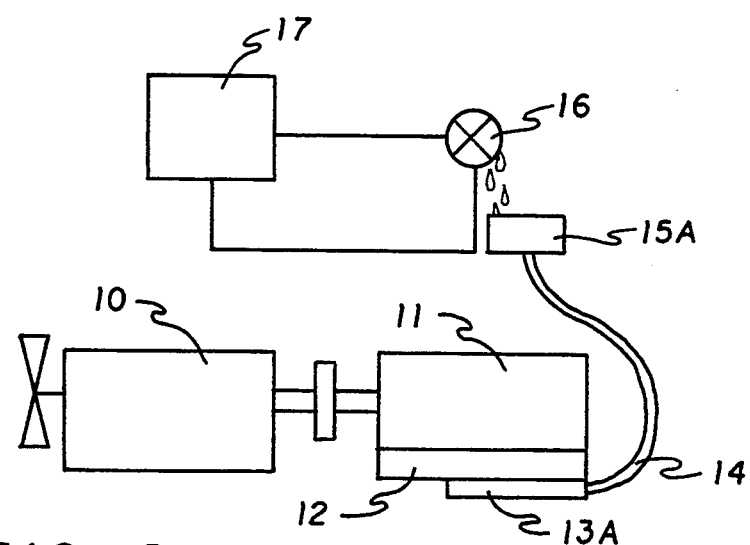
FIG. 2 is a diagrammatic view of a further embodiment of the invention illustrating an engine, transmission, transmission oil pan and air conditioning unit in which the condensate which naturally forms on the evaporator of the vehicle's air conditioning system is collected in a condensate collector funnel and directed to a foam condensate distributor located in front of and under the transmission oil pan to assist in cooling it.

Referring to FIG. 1, the invention is carried out with equipment comprising a conventional engine 10, transmission 11, transmission oil pan 12 and air conditioning unit 17. During normal operation of the engine 10, the impelling forces and interaction of the parts generate heat. In warmer ambient conditions, such as a hot summer day, and/or when the engine experiences great load, such as when the vehicle is pulling a trailer and/or when the air conditioning unit 17 is operated while the vehicle is in slow, heavy traffic, the engine and constituent systems experience even greater heat build-up. Vehicle manufacturers have recognized this phenomenon and offer "trailer-towing" packages to provide vehicles with better engine and transmission cooling capabilities.

In addition to the load created by the air conditioning unit 17 and the heat build-up associated with the load, a by-product of the air conditioning process is condensate which naturally forms on the evaporator 16 of the air conditioning unit 17. Prior to this invention, this condensate has not been utilized in the conservation of energy and has merely been discharged beneath the vehicle. This invention proposes to harness this previously untapped resource to relieve heat as it effects other engine systems which need cooling, particularly the transmission fluid as circulated through the transmission oil pan 12. Even though most automatic transmissions incorporate a cooling radiator juxtaposed the vehicle's engine coolant radiator, harsh driving conditions can impose upon the normal cooling capacity of many transmissions. Next to abusive use, excessive heat is the primary culprit leading to failed clutches, brakes and pumps in automatic transmissions.

As the drawings show, condensate forming on the evaporator 16, which was previously discarded upon the pavement, is now received within a condensate collector 15 or 15a. This collector may be a funnel or pan, or plurality or combination thereof. Structural disposition permitting, condensate drains naturally from the condensate collector 15 or 15a and through a condensate conduit 14 which leads to a condensate distributor 13 or 13*a* located under the transmission oil pan 12. The condensate distributor may comprise a foam mat 13 to provide for retaining the liquid condensate in communication with the transmission oil pan 12 or may comprise a tube or network of tubing 13*a*, or trough, pan or other heat exchanging element, or plurality or combination thereof. Communication of the cool condensate with the hot transmission oil pan 12 will cause heat transferral such that the transmission oil pan 12 will be cooled as the condensate evaporates.

Figure 3:
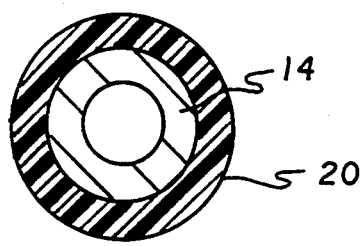
FIG. 3 is a cross-sectional, detail view illustrating an optional insulated conduit.

To reduce premature heating of the condensate as it is conveyed through the conduit 14, an insulative layer or casing may be applied about the conduit as shown in FIG. 3.

The present invention is not intended to be limited to the embodiments described above, but to encompass any and all embodiments within the scope of the following claims.

I claim:

1. A cooling system for a transmission oil pan in a vehicle having an air conditioning unit utilizing an evaporator comprising:

a condensate collector disposed adjacent the evaporator to receive condensate issuing from the evaporator during air conditioning unit operation;

a condensate distributor juxtaposed an outer surface of the transmission oil pan; so as to allow said condensate to be evaporated into ambient air below the transmission oil pan thereby evaporatively cooling the transmission oil pan; and a fluid conduit between said condensate collector and said condensate distributor; whereby said condensate collector receives condensate issued from the evaporator and with said conduit transmits it to said condensate distributor to enhance cooling of the transmission oil pan and retained fluid.

2. A cooling system according to claim 1 wherein said condensate collector comprises a pan.

3. A cooling system according to claim 1 wherein said condensate collector comprises a funnel.

4. A cooling system according to claim 1 wherein said condensate distributor comprises a foam mat.

5. A cooling system according to claim 1 wherein said condensate distributor comprises tubing.

6. A cooling system according to claim 1 wherein said condensate conduit includes an insulative covering.

* * * * *